US012043059B2

(12) United States Patent
Mesinovic et al.

(10) Patent No.: US 12,043,059 B2
(45) Date of Patent: *Jul. 23, 2024

(54) FARM IRRIGATION WHEEL

(71) Applicant: Shark Wheel, Inc., Mission Viejo, CA (US)

(72) Inventors: Ibrahim Mesinovic, Lerum (SE); David M. Patrick, Ladera Ranch, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 17/189,645

(22) Filed: Mar. 2, 2021

(65) Prior Publication Data

US 2021/0178809 A1   Jun. 17, 2021

Related U.S. Application Data

(63) Continuation-in-part of application No. 15/979,429, filed on May 14, 2018, now Pat. No. 10,933,687.

(51) Int. Cl.
*B60B 15/02* (2006.01)
*A01G 25/09* (2006.01)
*B60B 1/14* (2006.01)

(52) U.S. Cl.
CPC ............. *B60B 15/025* (2013.01); *B60B 1/14* (2013.01); *A01G 25/092* (2013.01); *B60B 15/021* (2013.01); *B60B 2360/102* (2013.01); *B60B 2360/50* (2013.01)

(58) Field of Classification Search
CPC ....... B60B 15/025; B60B 15/02; B60B 15/04; B60B 15/08; B60B 15/18; B60B 15/20; B60B 15/021; B60B 15/023; B60B 1/14; B60B 9/04; B60B 9/02; B60B 9/26; B60C 7/10; B60C 7/14; B60C 7/146
See application file for complete search history.

(56) References Cited

U.S. PATENT DOCUMENTS

| | | | |
|---|---|---|---|
| 555,330 A | 2/1896 | Price | |
| 836,578 A * | 11/1906 | DeHora | B60B 9/02 152/11 |
| 1,085,700 A * | 2/1914 | Percy | B60B 9/26 152/11 |

(Continued)

FOREIGN PATENT DOCUMENTS

JP          61175101 A  *  6/1986  ............. B60B 15/04

OTHER PUBLICATIONS

International Search Report, World Intellectual Property Office, Mar. 2, 2022.

(Continued)

*Primary Examiner* — Jason R Bellinger
(74) *Attorney, Agent, or Firm* — CIONCA IP Law P.C.

(57) ABSTRACT

A wheel having a hub and a circular ring is provided. The circular ring has a central axis, an outer surface having a first outer edge and a second outer edge, and a plurality of holes disposed on the outer surface. Additionally, the wheel has a plurality of spokes each being adapted to attach to both the hub and the circular ring, and each of the plurality of spokes being concaved and arranged in an alternating pattern. A plurality of lugs is disposed on the outer surface of the circular ring, and each of plurality of lugs has a first leg and a second leg, each extending from a center rib and a lug plate adapted to connect the first leg to the center rib.

19 Claims, 16 Drawing Sheets

(56) References Cited

U.S. PATENT DOCUMENTS

| | | | |
|---|---|---|---|
| 1,235,597 A * | 8/1917 | Raflovich | B60C 7/06 |
| | | | 152/402 |
| 1,309,006 A * | 7/1919 | Allen | B60B 15/02 |
| | | | 301/44.3 |
| D54,288 S | 12/1919 | Stothoff | |
| 1,414,537 A * | 5/1922 | Willig | B60B 15/02 |
| | | | 301/52 |
| 1,488,778 A * | 4/1924 | Cohen | B60B 9/26 |
| | | | 152/72 |
| 1,563,679 A * | 12/1925 | Wilmot | B60B 9/04 |
| | | | 301/63.109 |
| 1,622,111 A * | 3/1927 | Hawkins | B60B 15/025 |
| | | | 301/44.3 |
| 1,742,100 A * | 12/1929 | Rozankovich | B60B 9/26 |
| | | | 152/84 |
| 3,078,128 A * | 2/1963 | Speidel, Jr. | B60B 15/021 |
| | | | 305/51 |
| 4,093,299 A * | 6/1978 | Capps | B60B 17/0031 |
| | | | 301/66 |
| 5,046,785 A | 9/1991 | Bockerman | |
| 5,078,454 A | 1/1992 | Rollinson | |
| 5,154,490 A | 10/1992 | Burns | |
| 5,353,853 A * | 10/1994 | Hansson | B60B 9/00 |
| | | | 152/5 |
| 5,390,985 A | 2/1995 | Chandler | |
| 6,637,828 B2 * | 10/2003 | Braunschweiler | B60B 9/04 |
| | | | 301/79 |
| 7,980,282 B2 * | 7/2011 | Moyna | B60C 11/02 |
| | | | 152/305 |
| 8,657,215 B1 * | 2/2014 | Blum | A01G 25/095 |
| | | | 301/43 |
| 9,283,810 B2 * | 3/2016 | Korus | B60C 7/24 |
| 9,539,856 B2 * | 1/2017 | Visscher | B60B 15/20 |
| 10,118,444 B2 * | 11/2018 | Abe | B60B 9/26 |
| 10,994,571 B2 * | 5/2021 | Beck | B60B 3/001 |
| 2008/0211301 A1 | 9/2008 | Jee et al. | |
| 2016/0037703 A1 | 2/2016 | Cook | |
| 2017/0174005 A1 * | 6/2017 | Van Riper | B60C 7/146 |
| 2020/0031163 A1 * | 1/2020 | Waldner | B60B 19/00 |
| 2022/0266625 A1 * | 8/2022 | Patrick | B60C 7/08 |

OTHER PUBLICATIONS

PCT/US23/77145, Patent Cooperation Treaty, International Search Report, Feb. 28, 2024.

PCT/US23/77145, Patent Cooperation Treaty, Written Opinion of the International Searching Authority, Feb. 28, 2024.

* cited by examiner

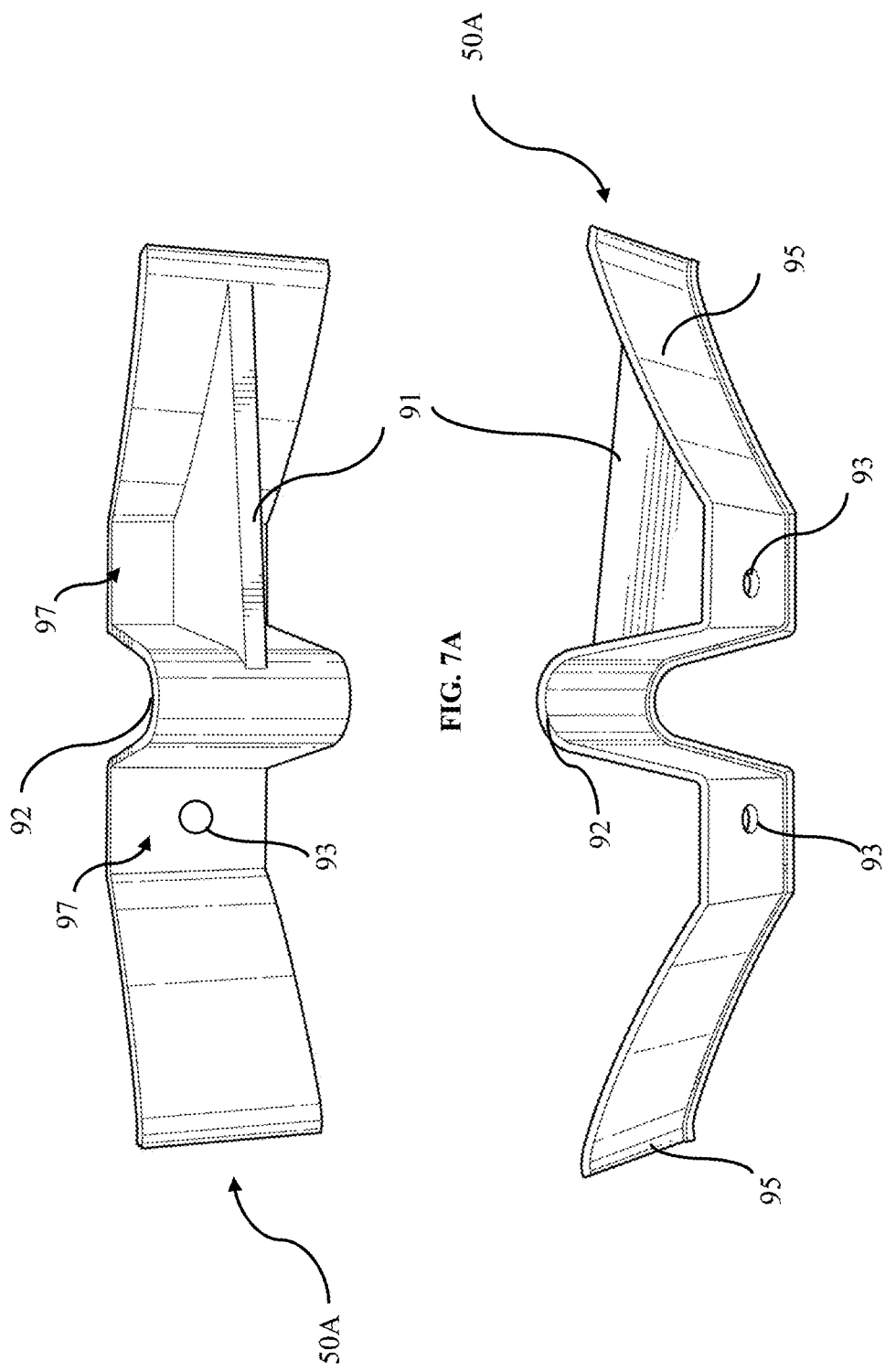

FARM IRRIGATION WHEEL

CROSS-REFERENCE TO RELATED APPLICATIONS

This application is a continuation-in-part of U.S. Non-Provisional application Ser. No. 15/979,429, filed on May 14, 2018, which has issued as U.S. Pat. No. 10,933,687 on Mar. 3, 2021, which is hereby incorporated by reference, to the extent that it is not conflicting with the present application.

BACKGROUND OF INVENTION

1. Field of the Invention

The invention relates generally to utility wheels and more particularly, to wheels used in farming applications, such as wheels used in conjunction with crop irrigation equipment.

2. Description of the Related Art

Currently, center pivot irrigation is a form of overhead sprinkler irrigation, which uses a machine having pipe segments arranged in linear arms, with sprinklers positioned along the arms which may be supported by trusses mounted on wheeled units with such units set at several points along the arms. In one version, the arms are driven in a circular pattern and is fed with water from a pivot point at the center of the circle. For a center pivot to be used, the terrain upon which it rotates must be reasonably flat; but may move over an undulating surface. The arms typically may be between 1200 and 1600 feet in length forming a circle radius. These systems may be water-powered, hydraulic powered or electric motor-driven. The outermost wheels set the pace of rotation with a full circle made once every three days for example. The inner wheels are auto-controlled to keep the arms relatively linear during movement. Sprinkler sizes are progressively larger over the distance from the pivot point to the outer circumference of the circle. Crops may be planted in straight rows or in circles to conform to the travel of the irrigation system.

Additionally, center-pivot irrigation typically uses less water and require less labor than furrow irrigation. This results in lower labor costs, reduces the amount of soil tillage required, and helps reduce water runoff and soil erosion. Less tillage also encourages more organic materials and crop residue to decompose back into the soil and reduces soil compaction. Inflatable tires are widely used on center-pivot irrigation rigs because they have excellent performance on soft soil and mud due to their compliance causing flattening as they roll in contact with a surface. During flattening the tire's footprint (contact surface) grows thereby reducing contact pressure and reduced contact pressure reduces the tendency to sink into the ground ruts are less pronounced.

Furthermore, current center pivot irrigation wheels lack strength and durability in the wheels because of pneumatic tires typically used. Moreover, current center pivot irrigation wheels also do not have any traction support for once the wheel has already entered a rut. Pneumatic tires in the irrigation application also require air pressure maintenance due to air loss and typically have rutting issues.

Therefore, there is a need to solve the problems described above by proving a device for improved traction for crop irrigation equipment.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a farm irrigation wheel having a hub, a circular ring, a plurality of spokes, and a plurality of lugs is provided. The circular ring has a central axis, an outer surface having a first outer edge and a second outer edge, and a plurality of holes disposed on the outer surface. Additionally, the wheel has a plurality of spokes each being adapted to attach to both the hub and the circular ring, and each of the plurality of spokes being concaved and arranged in an alternating pattern. The plurality of lugs is disposed on the outer surface of the circular ring, and each of plurality of lugs has a first leg and a second leg, each extending from a center rib and a lug plate adapted to connect the first leg to the center rib. Thus, an advantage is better traction due to the lugs having a protrusion and the concavity of the spokes. Further improving the traction is the spokes of the wheel because they may penetrate the soil and help the wheel not slip if it is moving through an existing rut. Additionally, outer surface of the wheel help to reduce the formation of ruts and maintenance of traction in soft earth.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 7A illustrates a perspective view of the lug, according to an embodiment.

FIG. 7B illustrates a perspective view of the lug, according to an embodiment.

DETAILED DESCRIPTION

Figure 1A:
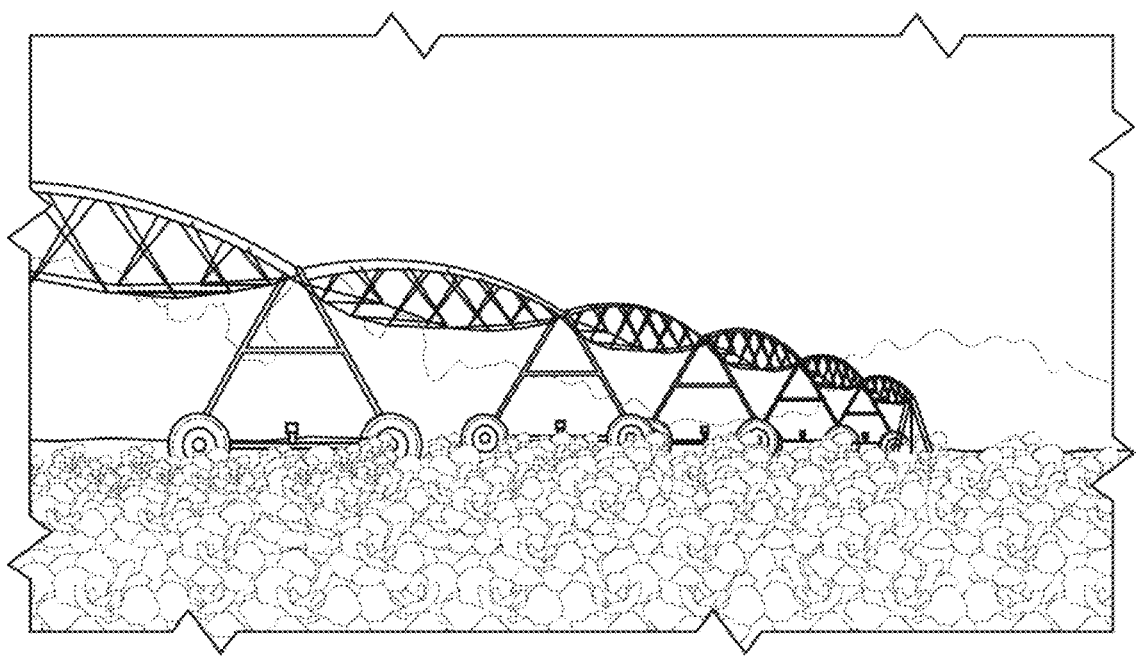
FIG. 1A illustrates a center pivot irrigation system as used in farming, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

In the foregoing description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
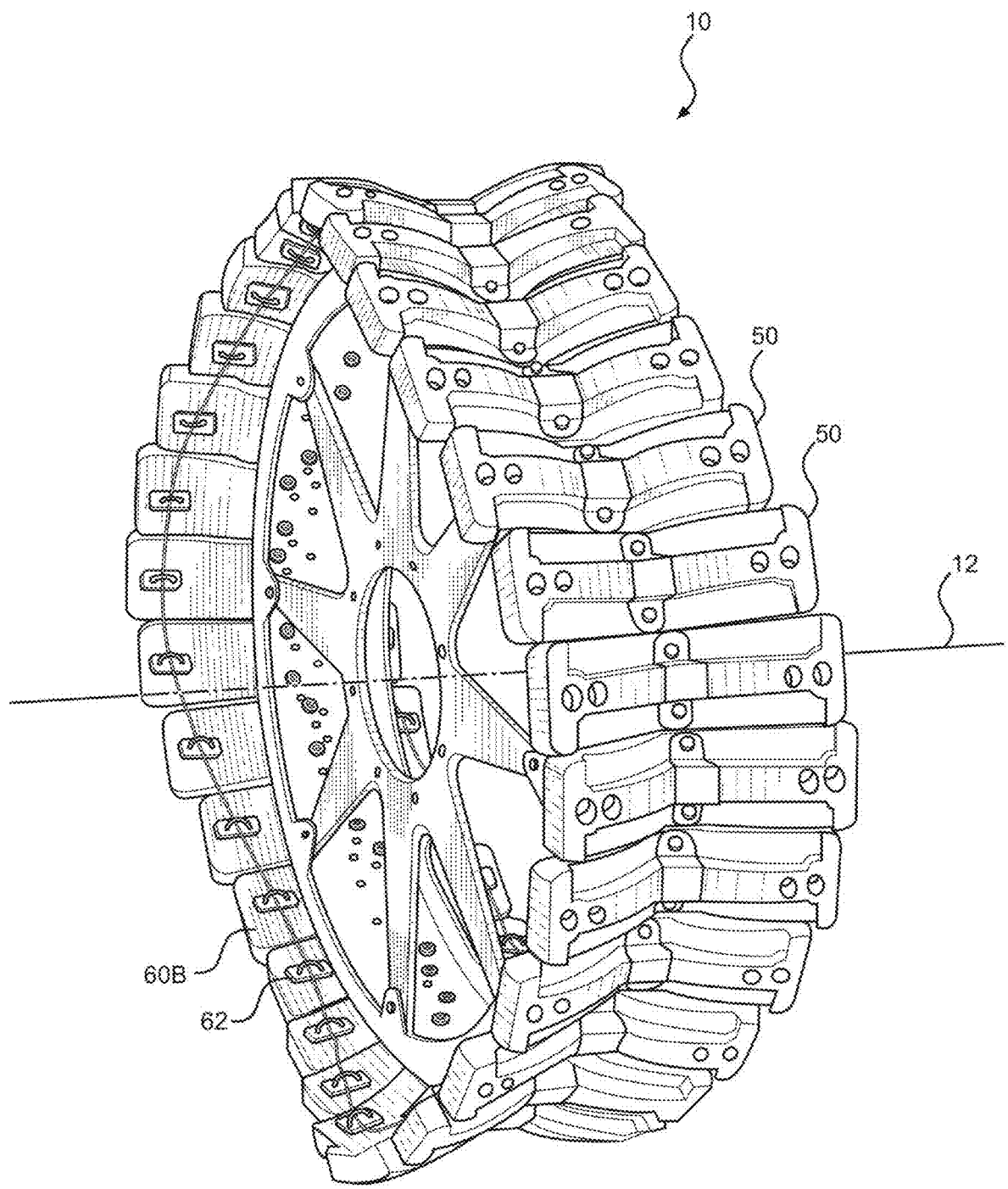
FIG. 1B illustrates a perspective view of an embodiment of a wheel used in center pivot irrigation systems, according to an aspect.
Figure 2:
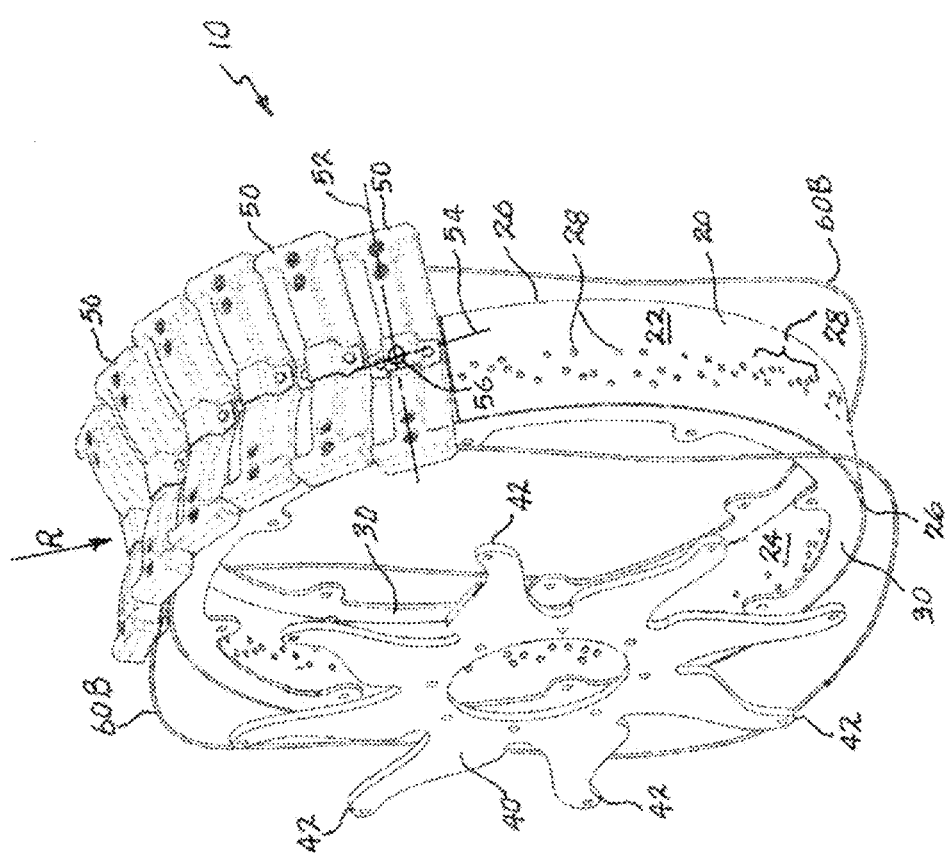
FIG. 2 illustrates a further perspective view of the farm irrigation wheel, according to an aspect.

FIG. 1A illustrates a typical center pivot irrigation operation in progress. As described in detail herein, a utility farm wheel ("wheel," "farm wheel") 10 as used in this type of irrigation as best illustrated in FIG. 1B is provided. As shown in FIG. 2, the wheel 10 may be an assembly of individual parts that may be joined together in various ways. In an embodiment, the individual parts may include a ring 20, a pair of rims 30, one or two disk portions 40, and a plurality of identical lugs 50. In this embodiment, shown in FIG. 1B a tensioning device 60B typically either a tension band (not shown) or a tension cable may also be used and may improve the alignment of the lugs 50. The parts may be made of metal or other materials providing suitable tensile strength, elasticity, flexibility and other characteristics as will be known by those of skill in the mechanical arts and as described herein.

Figure 3:
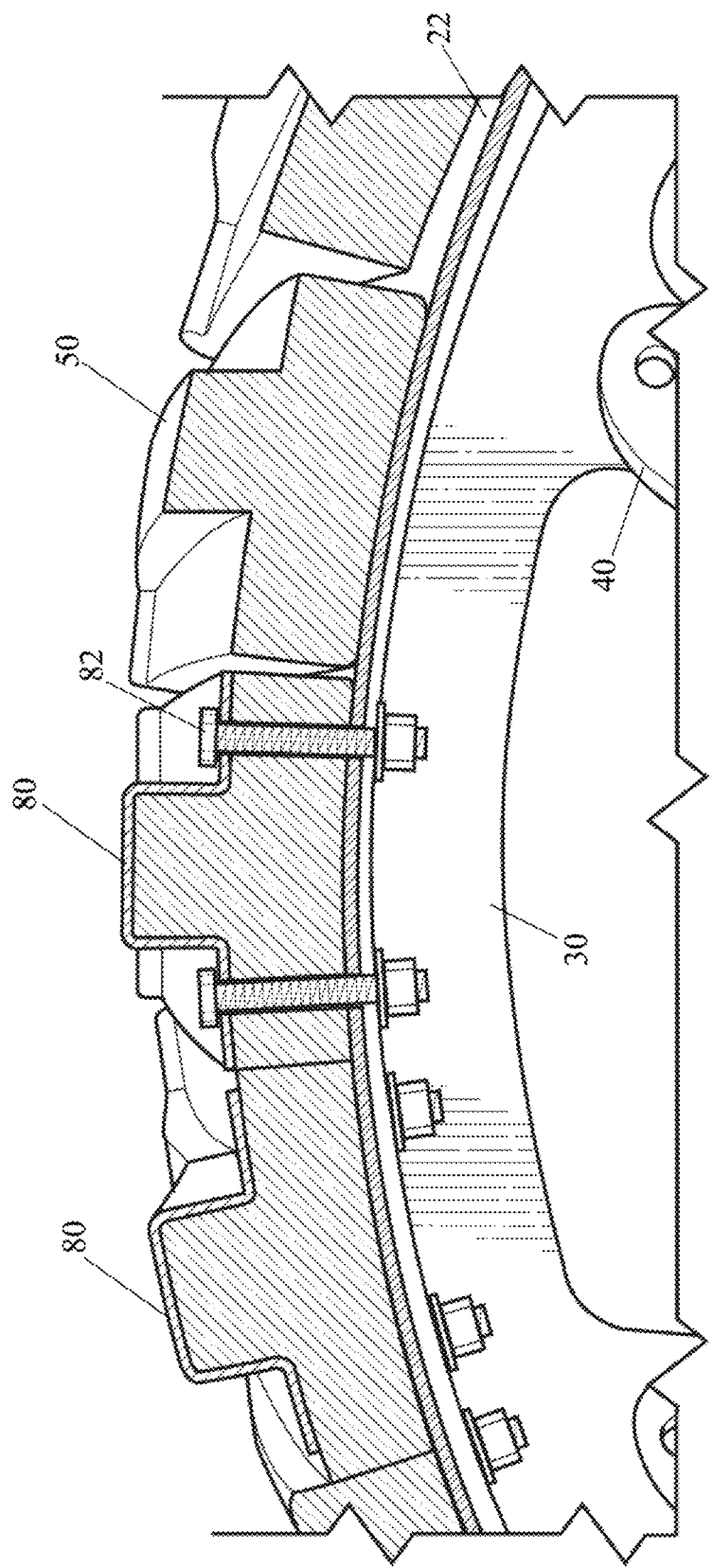
FIG. 3 illustrates a partial vertical section view of the farm irrigation wheel, according to an aspect.

Additionally, the ring 20 may be manufactured by laser cutting a flat strip of metal and then rolling it to form a cylinder with ends overlapped and welded together. Therefore, the ring 20 may have an outer surface 22 an inner surface 24 and a pair of opposing edges 26. The ring 20 may have a pattern of through holes 28 in its surface as shown in FIG. 2. The rims 30 may be secured to the edges 26 of ring 20 by welding, for instance, and the ends of legs 42 of disk portion 40 may be secured to rim 30 using common hardware. The lugs 50 may be bolted onto the outer surface 22 as shown in FIG. 3. Each lug 50 may be mounted on ring 20 by a bracket 80, possibly of shaped sheet metal, and held in place by bolts 82 as shown. The holes 28 may be arranged in different patterns permitting lugs 50 to be arranged in alternative configurations as will be described. The wheel 10 has a central rotational axis 12. As shown in FIG. 2, the lugs 50, as sighted radially toward wheel 10 (see arrow R), are rectangular in shape having a long axis 52 positioned centrally between its opposing long sides, and a short axis 54 positioned centrally between its opposing short sides. The point where long axis 52 and short axis 54 cross is a central point 56 of lug 50.

Figure 4:
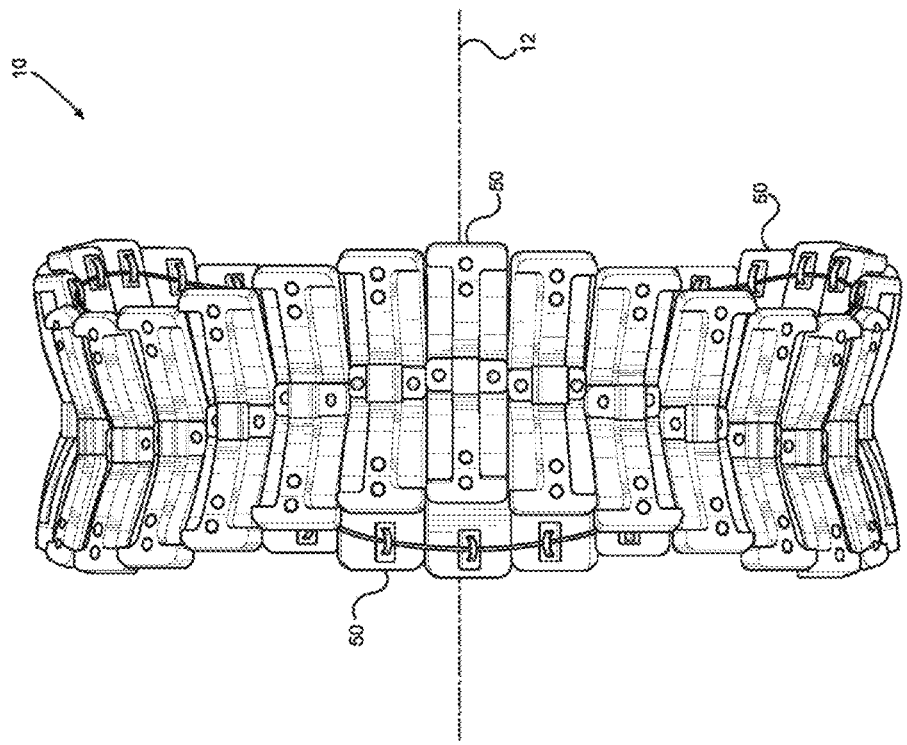
FIG. 4 illustrates a front elevation view of the farm irrigation wheel, according to an aspect.

The lugs 50 may be fixed to the surface 22 such that long axes 52 are parallel to wheel rotational axis 12, see FIG. 1B. The lugs 50 may be placed in side-by-side positions around ring 20 with their short axes 54 aligned colinearly and centered between opposing edges 26, that is, centered on ring 20; this is one mounting option. However, the lugs 50 may alternately be positioned on ring 20 in laterally offset positions (see FIG. 5) with respect to each other to form a continuously and possibly smoothly varying locus of the central points 56 as shown in FIG. 4. In an embodiment, the smoothly varying locus of central points 56, may execute a sinusoidal curve having a sinusoidal amplitude and a sinusoidal period. The sinusoidal amplitude may be varied by changing the magnitude of the lateral incremental positions of the centers 56 of one lug 50 relative to the next. On the other hand, the distance about the circumference of wheel 10 of a single sinusoidal cycle may be varied by changing the circumferential width of lugs 50. In all cases, the positions of the lugs 50 are determined by the position of holes 28 in ring 20. Those of skill in the art will be able to determine the locations of holes 28 to produce a desired sinusoidal or alternate arrangement of the lugs 50.

Figure 5:
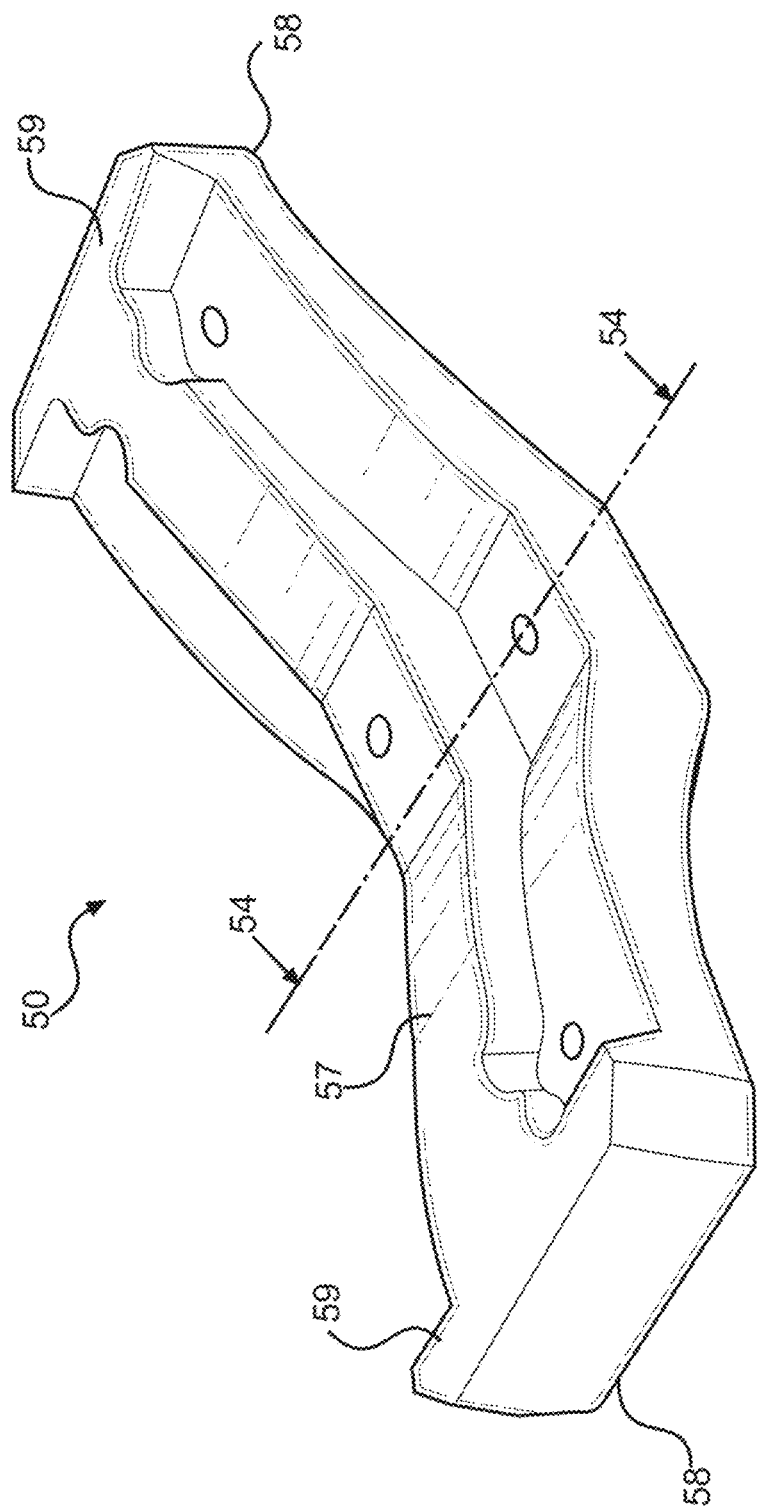
FIG. 5 illustrates a perspective view of a lug of the farm irrigation wheel, according to an aspect.

As shown in FIG. 5, each lug 50 may have an outwardly directed roughly V-shape (as sighted along the circumference of wheel 10). The two opposing legs 58 of said V-shape diverges from surface 22 on either side of axis 54 where the lug 50 is fastened to ring 20. During rotation of wheel 10 each lug 50 contacts a surface upon which wheel 10 rides. Such contact is initially made by the extreme lateral ends of lug 50 along axis 52. Upon further wheel rotation greater weight is brought to bear on the legs causing the divergent angle to lessen and cause greater strain within lugs 50. A rib 57 extends in the direction of axis 52 across the outfacing portion of leg 50 and provides a means for wheel 10 to develop greater traction especially in relatively soft farm soil. At the ends of the legs of lug 50 are ribs 59 positioned orthogonal to rib 57 in order to limit sideways slippage of wheel 10.

The tensioning device 60B may be made of high-strength Nylon® cable or stainless-steel band stock and may be fixed to lugs 50 on both left and right lateral underside surfaces of the legs by cleats 62 as shown in FIG. 1. The device 60B may allow a gap between adjacent lugs 50, if any, is, and remains consistent and also may allow lugs 50 to be pre-tensioned for a desired stiffness, that is, drawing the divergence angle of the legs of lugs 50 away from surface 22 to a greater or lesser degree. This also enables adjacent lugs 50 to share and transfer loads between them which is important for sharing and distributing shock loads when obstacles such as rocks are encountered.

Figure 6:
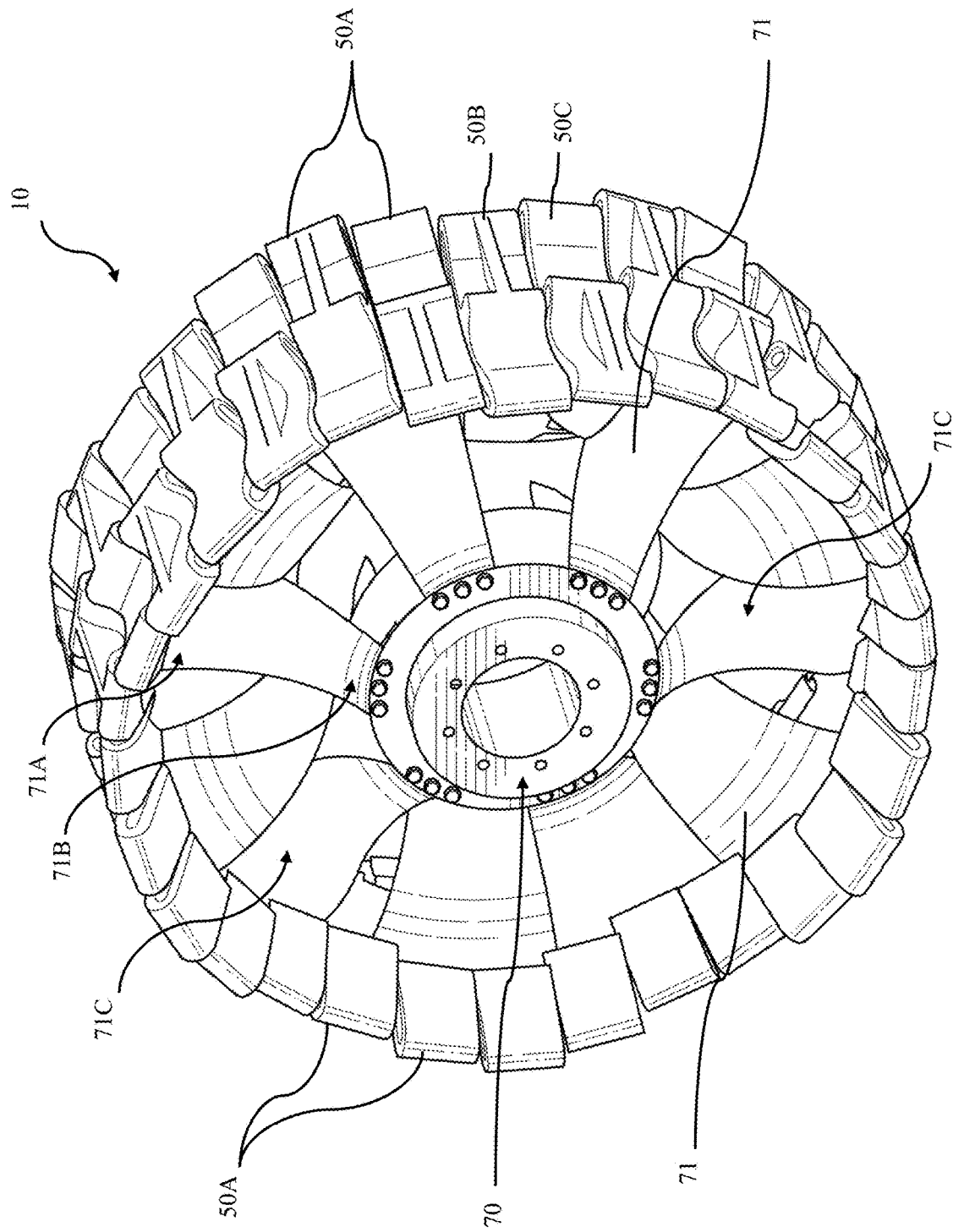
FIG. 6 illustrates a perspective view of the farm irrigation wheel, according to an embodiment.

FIG. 6 illustrates a perspective view of the farm irrigation wheel, according to an aspect. In another embodiment, the individual parts may include a ring 20 (shown in FIG. 9), a hub 70, a plurality of spokes 71, and a plurality of identical lugs 50A. As shown, the farm irrigation wheel 10 may have a hub 70, spokes ("fins") 71, lugs 50A, and a ring 20. As described herein, the disk portion 40, shown in FIG.2, may be broken up into hub 70 and spokes ("fins") 71 components. Furthermore, having the hub 70 and the spokes 71 as separates parts may allow for better durability. Additionally, having each spoke 71 as a separate component may allow for easier maintenance. For example, if a spoke 71 were to be damaged, the single spoke 71 may be replaced without the need of replacing the entire wheel 10. Again, instead of legs 58 on a rim 30, the farm irrigation wheel 10 may have a hub 70 with spokes 71, which may provide additional strength to the wheel and more traction.

As shown in FIG. 6, the spokes 71 may be concaved and attach at alternating locations. The spokes 71 of the wheel 10 can act as traction and help the wheel not slip if it is moving through an existing rut. Typically, wheel hubs and spokes only have a purpose to handle loads, while, as described herein, the spokes 71 provide additional traction. The spokes 71 may aid in traction, if necessary, by cutting into the ground surface (i.e., soil or dirt). For example, if the wheel 10 begins to sink below ground level (i.e., in a 'rut' or 'trench') the wheel 10 may continue to function due to the spokes 71.

The spokes ("fins") 71 may have a concave surface 71C increase strength. This allows for an increase in strength but may keep costs down due to the spoke's 71 thin structure. while keeping the metal very thin for cost purposes. Additionally, the spokes 71 allow the center of gravity of the wheel to be at the center of the hub at times, allowing the wheel 10 to be well-balanced, which will be described in more detail herein.

The wheel 10 is 'compliant' and may bend and flex to absorb heavy loads. Furthermore, both the spokes 71 and the lugs 50A may be compliant to allow for the appropriate flex in the 10 to handle larger loads. Additionally, outer surface of the wheel may help to reduce the formation of ruts and maintenance of traction in soft earth.

The lugs 50A may also have lug plates that are horizontal and raised higher than the lugs 50 shown in FIG. 5, the lugs 50A provide additional traction to the wheel 10. Furthermore, the spokes 71 may provide traction for the wheel 10 if the wheel does sink in the soil. The sine wave of the ring 20 may further help with traction because the sine wave pushing the soil towards the center to provide more traction for the wheel 10. The geometric shape of the spokes 71 may act as, for example, a person swimming, the spokes 71 help grip soil to dig out of a hole similar to arms while swimming. Furthermore, the spokes 71 may act as paddles to help dig the wheel 10 out of any soil or rut. Additionally, if the wheel 10 sinks in soft soil, the spokes 71 act similarly to the arms and hands of a swimmer to advance and move forward in the alternating arm or paddle like motion.

For example, a pair of the spokes 71 cut into the ground evenly and push the wheel upwards when necessary (i.e., in a rut). Current wheels do not usually have a center traction element that the spokes 71 provide. Moreover, the crossing and curvature of each spoke 71 may contribute to the traction, only when the wheel 10 has sunk into soft soil.

As shown, each spoke 71 may have a narrow end 71B and a wider end 71A, and each wider end 71A may be mounted to a sinusoidal peak 78 on the ring 20. The changing width of each spoke 71 may eliminate, or reduce, the resonance force. The each spoke 71 attaches with the narrow end 71B to the hub 70 to help reduce the resonance force reaching the hub 70 as the vibrations move through the wheel 10. Reducing the resonance force reaching the hub 70 may help avoid deterioration of the wheel 10.

Additionally, the spokes 71 may act as shocks and absorb vibration, stresses and loads of the wheel, which increases the strength of the wheel 10 by adding a compliant aspect to the design. The concavity of the spokes 71 may increases the strength geometrically speaking, which will be discussed in more detail when referring to FIG. 10C. The concavity of the spoke 71 may be manufactured through metal forming. In another example, the concavity of the spoke 71 may be created during installation of the spokes 71 into the ring 20.

The wheel may be made of a low-grade carbon steel for cost purposes, but a preferred material may be spring steel. Spring steel may be preferred to control and increase the elasticity and compliance of the wheel 10 and lugs 50A. The geometry of the spokes 71 may allow the spokes 71 to flex, and the spokes 71 may interfere with each other once the spokes 71 bend to a certain point. For example, under a large load, immediately adjacent spokes 71 may support a center flexing spoke 71. The two adject spokes 71 may provide the resistance for the spoke 71 between them. While in a resting state, with no load applied the spokes 71 may not be touching. It should be noted the space between the spokes 71 is also narrowing as the spokes 71 move towards the hub 70 and are nearly touching before a load is applied.

Figure 7C:
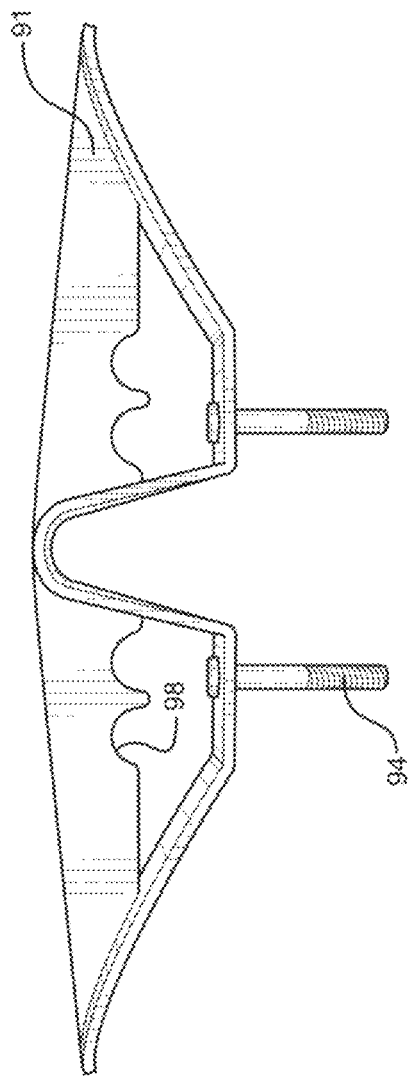
FIGS. 7C-7F illustrate a side view of the lug, according to an embodiment.
Figure 7D:
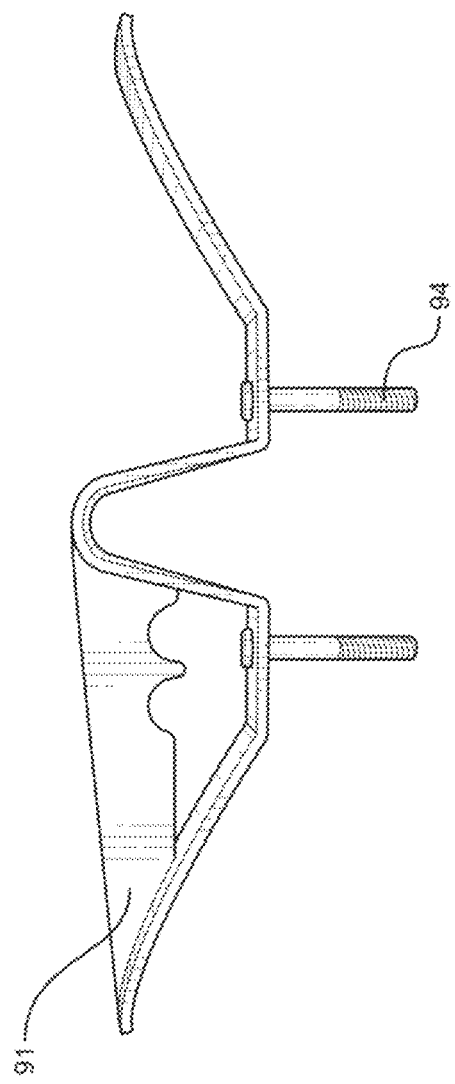

FIG. 7A illustrates a perspective view of the lug, according to an aspect. While FIG. 7B illustrates an interior view of the lug, according to an aspect. Additionally, the lug shown in FIGS. 7A and 7B, the lugs 50A may have metal built into the lug 50A interior. Moreover, a liquid rubber may be overmolded onto the metal for additional strength and durability. The metal interior may allow the lug 50A to flex and twist, which is necessary in the typical abusive farming environment. For example, the lugs 50A may be made of spring steel, and may have the additional rubber overmold. Each lug 50A may be mounted on ring 20 by a bolt. The holes 28, shown in FIG. 9, may be arranged in different patterns permitting lugs 50A to be arranged in alternative configurations as will be described. The lugs 50A may have a flat portion with bolt holes 93 to allow the lugs 50A to easily secure to the ring 20.

A lug plate 91 extends in the direction of axis across the outfacing portion of leg 50 and provides a means for wheel 10 to develop greater traction especially in relatively soft farm soil. At the ends of the legs of lug 50A are lug plate 91 positioned orthogonal to center rib 92 in order to limit sideways slippage of wheel 10. It should be understood that the lug 50A could be built in other ways such as having, for example, a metal interior frame with an overmolded rubber coat.

The lugs 50A may have a lug plate 91 to further help with traction while the wheel 10 is in use. The both the lug plates 91 and the center peak ("center rib") 92 on the lugs 50A may allow the wheel 10 to have proper traction on the softer farming soils. Additionally, the orientation of the lugs 50A may further help with traction over the farming landscapes. How they attach—bolt holes 93. As shown, each of the plurality of lugs 50A may opposing legs 95 forming a W-shaped structure aligned with said central axis. Moreover, the lug plate 91 may connect the lug legs 95 to lug center rib 92, while also being connected to the flat portion 97 of the lug 50A. As described herein, the lug plate 91 may provide additional structural support, while also providing additional traction for the wheel 10. As another example, the lug 50A may have a lug plate 91 on both sides of the center rib to provide additional traction and support, shown in FIGS. 7C, 7F, and 7G.

Additionally, the lugs 50A may be positioned in an alternating pattern, as shown in FIG. 6. The lugs 50A may be oriented to have the lug plate 91 on one side while the next adjacent lug 50A may have the lug plate 91 on the opposing side. For example, as shown in FIG. 6 lug 50B and lug 50C depict the alternating pattern of the lugs 50A orientation along the ring 20. Each of the plurality of spokes 71 may be concaved and arranged in an alternating pattern. The alternating pattern may be, as shown, the top end 71A of each of the plurality of spokes 71 being attached alternately to the first outer edge 20A or the second outer edge 20B of the circular ring 20 and the bottom end 71B of each of the plurality of spokes is attached alternately to the first side 75 or the second side 74 of the hub.

Figure 7E:
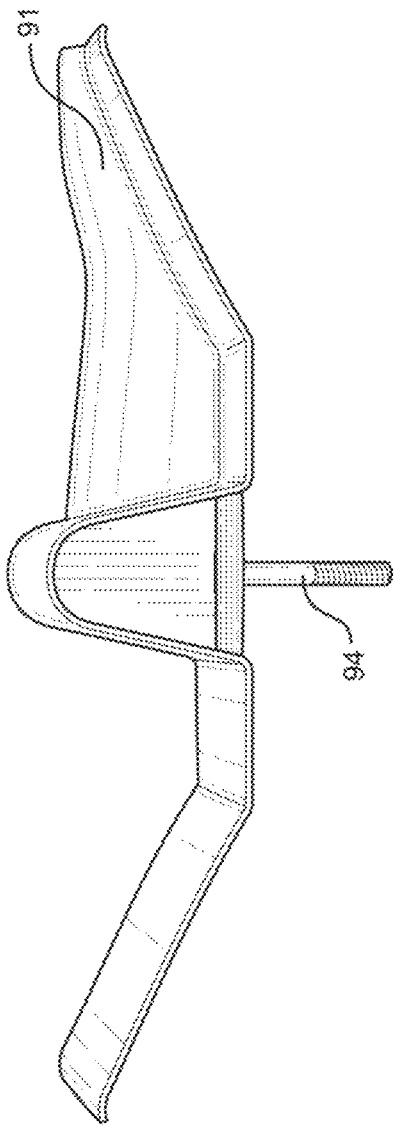
Figure 7F:
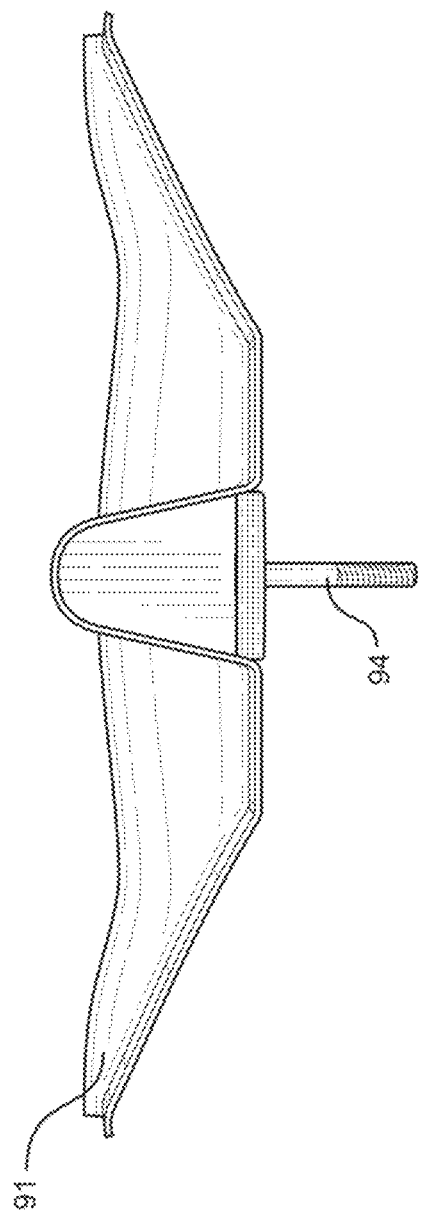

FIGS. 7C-7F illustrate a side view of the lug, according to an embodiment. As another example, the lug 50A may have a lug plate 91 on both sides of the lug, shown in FIGS. 7C and 7F. Furthermore, as shown the lug plate 91 may not attach to the flat portion 97. Additionally, the lug plate 91 may have cutouts 98, for example, to lower costs but maintain the structural integrity of the lug 50A. Additionally, the cutouts 98 may allow mud and debris to escape and not get stuck in the lug 50A. As shown in FIGS. 7E and 7F, the lugs 50A may have a solid center rib 92. As an example, the lug 50A may have a solid center rib 92 to provide additional strength. Also, as shown, the bolt holes 93 and bolts 94 may be in the center of the lug 50A instead of positioned in the flat portions.

Figure 7G:
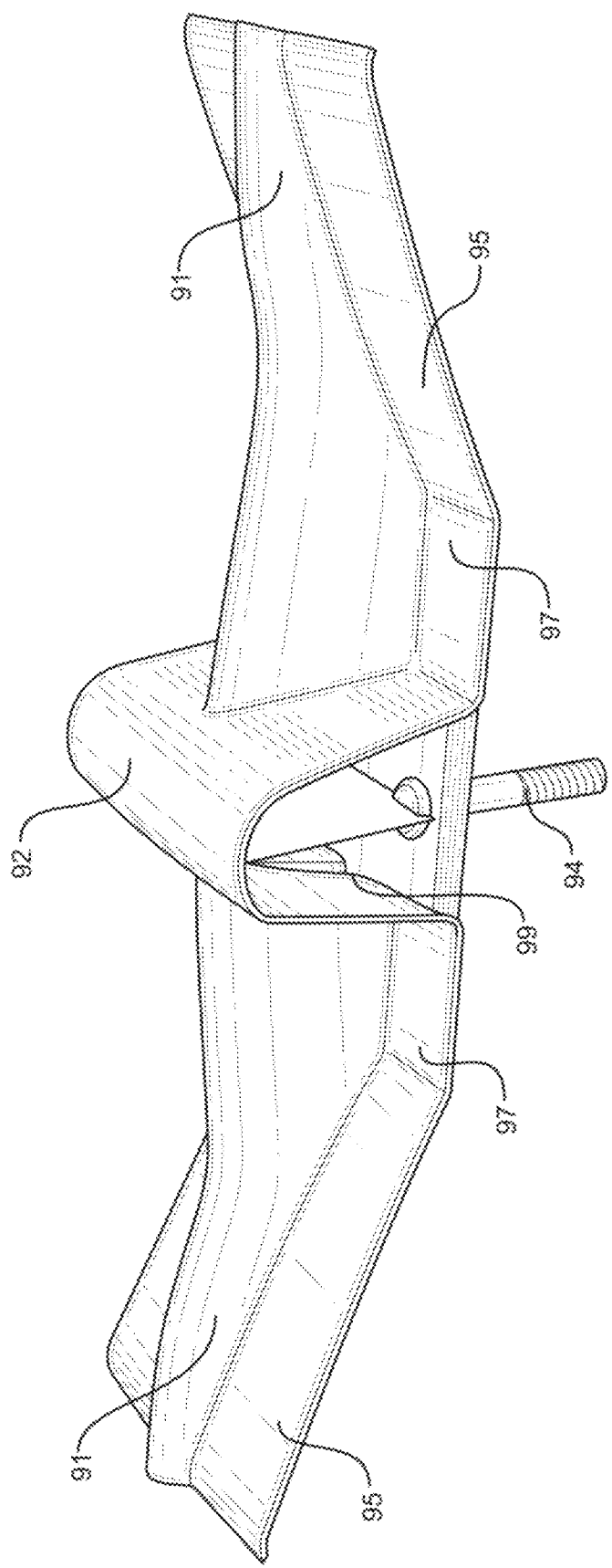
FIG. 7G illustrates a perspective view of the lug, according to an embodiment.

FIG. 7G illustrates a perspective view of the lug, according to an embodiment. As shown, lugs 50A may have a solid center rib 92. For example, the lug 50A may be made of a spring steel, while the interior 99 of the center rib 92 may be a rubber material. Having the spring steel as the exterior of the lug 50A and as the material which is in contact with the ground allows the lugs 50A and wheel 10 to be more durable. Additionally, shown in FIG. 7G, the lug plate 91 may have a triangular cross section, where the widest portion of the lug plate 91 is where the lug plate mees the flat portions 97. The triangular cross section of the lug 50A, shown in FIG. 7G, may allow the lug plate 91 to be stronger during use. The wide bottom of the lug plate 91 may help the lug plate from breaking off during use. As described herein, the lug plate 91 allows for improved traction for the wheel 10. Furthermore, the highest point of the lug 50A may be the solid center rib 92, which would help when the wheel 10 may transverse hard surfaces. For example, this is due to the solid center rib 92 having a hard exterior surface while having the additional interior rubber support. Moreover, solid center rib 92 being the highest point of the lug 50A may allow only the top surface of the center rib 92 to touch the ground while on a harder surface.

Figure 7H:
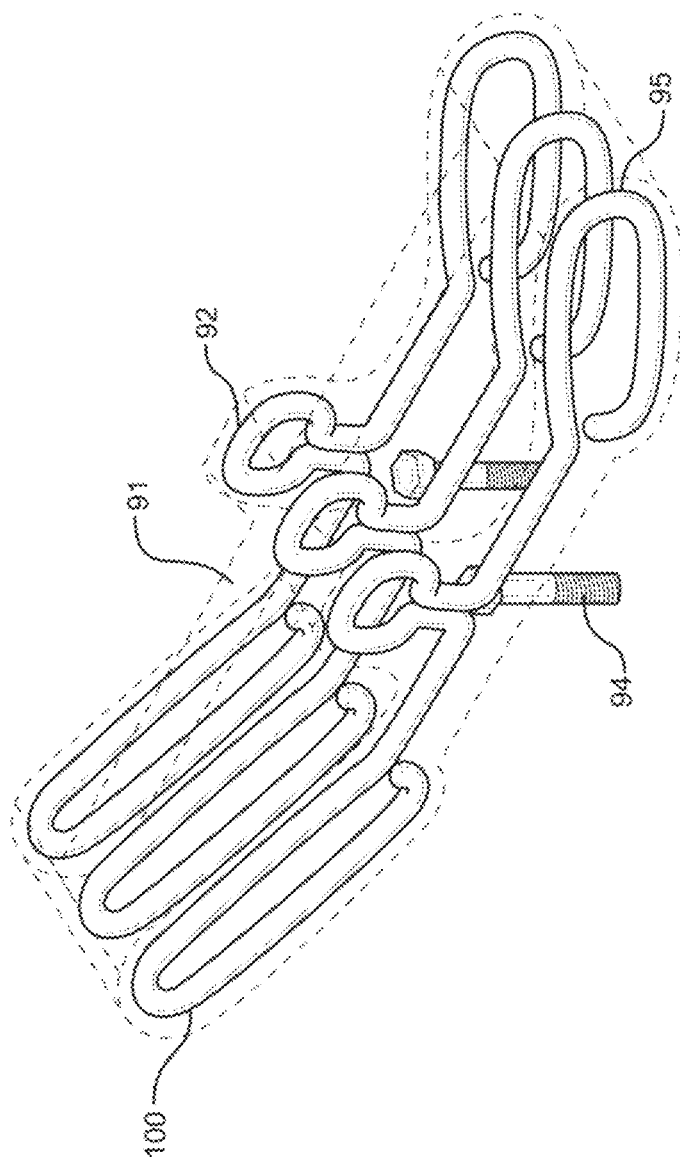
FIG. 7H illustrates a perspective semitransparent view of the lug, according to an embodiment.

FIG. 7H illustrates a perspective semitransparent view of the lug 50A, according to an embodiment. As shown, the lug 50A may have a metal frame 100 interior. The metal frame 100 may be a wire spring steel and overmolded rubber for maximal compliancy. Also, as shown, the bolt holes 93 and bolts 94 may be in the center of the lug 50A instead of positioned in the flat portions. Again, the lug plates 91 allows for improved traction for the wheel 10. For example, as shown, the metal frame 100 interior may be a plurality of wire components to create the lug shape. Furthermore, the highest point of the lug 50A may be the center rib 92, which would help when the wheel 10 may transverse hard surfaces, for example, when on a road prior to the soft farming soil.

Figure 8:
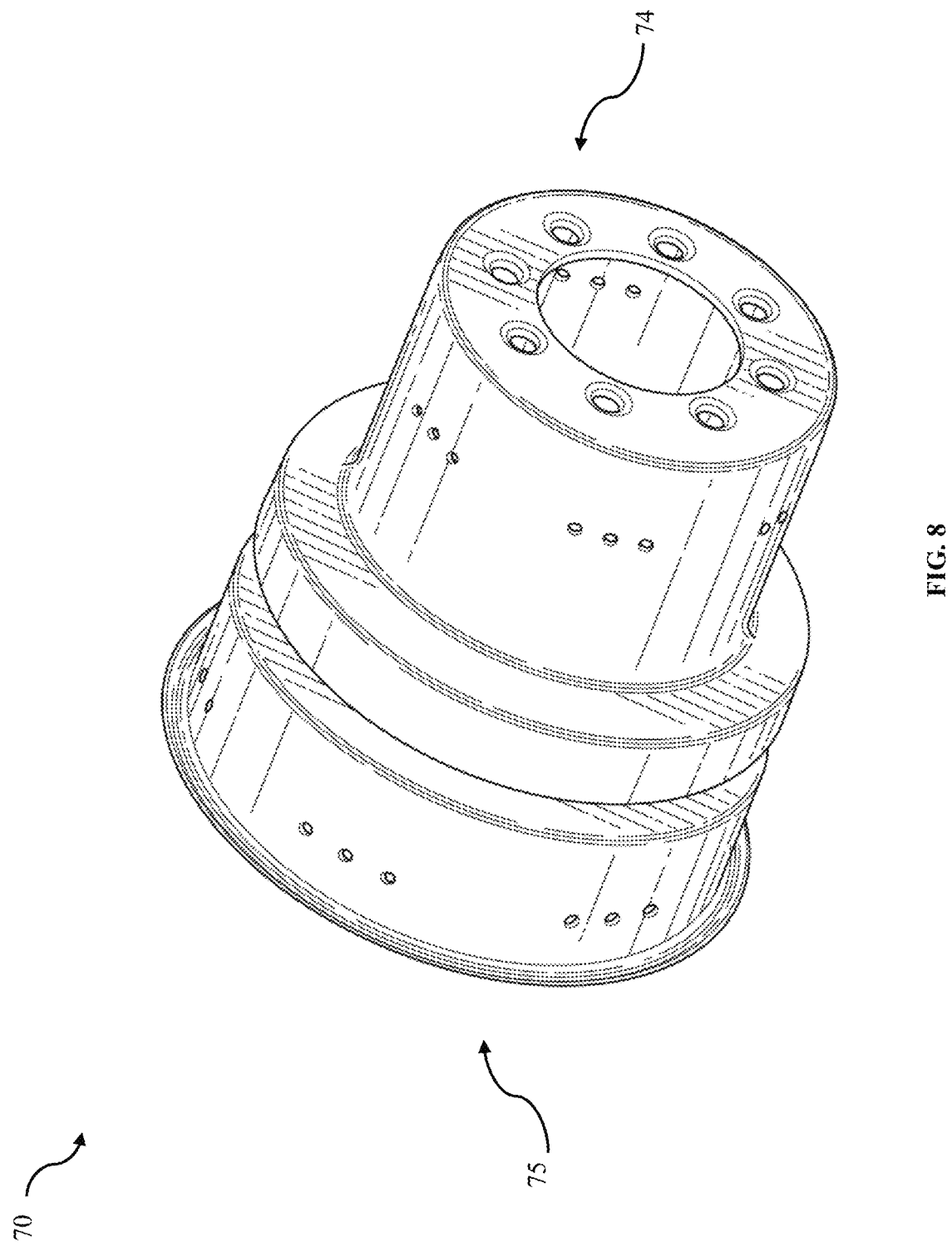
FIG. 8 illustrates a perspective view of the farm irrigation wheel hub, according to an embodiment.

FIG. 8 illustrates a perspective view of the farm irrigation wheel hub ("hub") 70, according to an embodiment. As shown, the hub 70 has a narrow end ("second side") 74 and a wider end ("first side") 75, which allows the farm irrigation wheel 10. Additionally, the hub 70 allows the farm irrigation wheel 10 to be attached to a center pivot irrigation system, as shown in FIG. 1A. The hub 70 also allows the alternating pattern of the spokes 71 to be securely attached. As described herein, the spokes 71 allow the wheel 10 to have traction even if the wheel 10 becomes somewhat submerged in the landscape.

Figure 9:
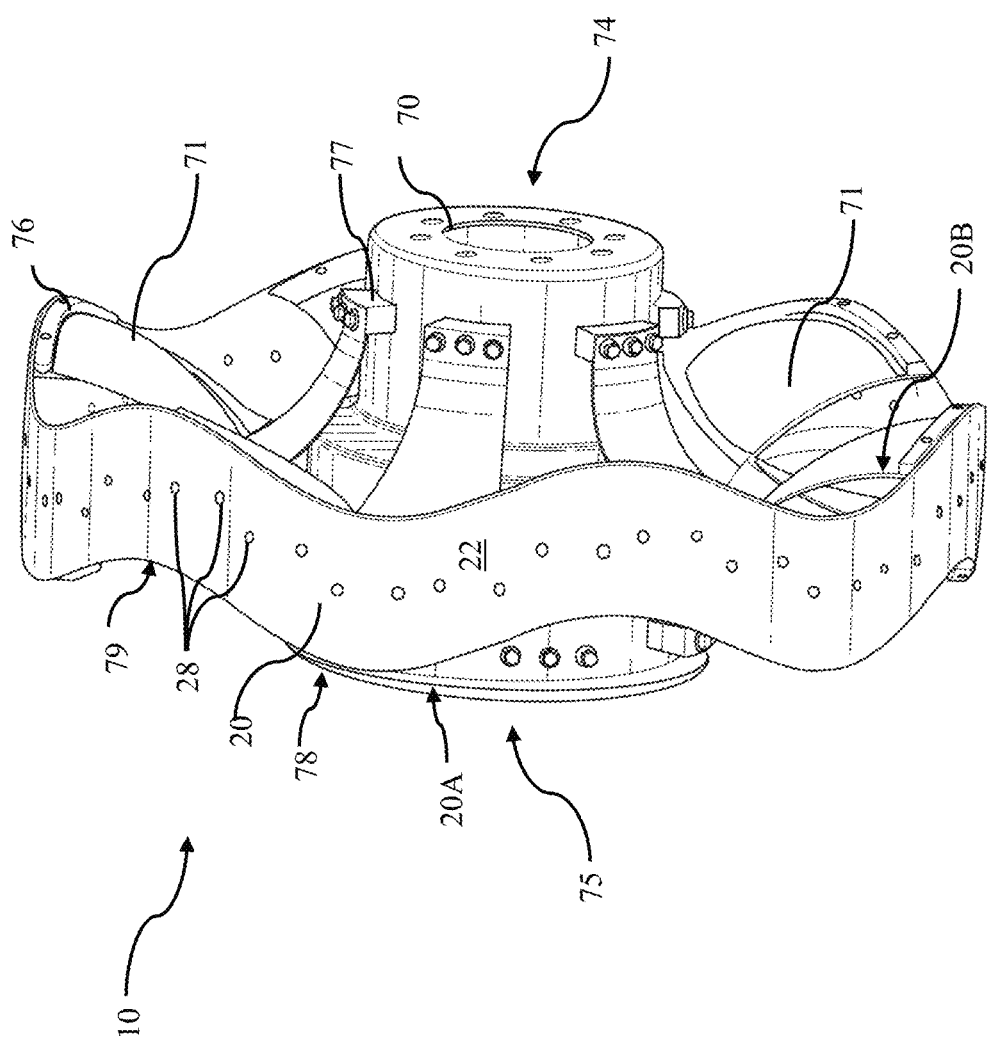
FIG. 9 illustrates a perspective view of the farm irrigation wheel without the lugs attached, according to an embodiment.

FIG. 9 illustrates a perspective view of the farm irrigation wheel 10 without the lugs 50 attached, according to an aspect. The plurality of lugs (not shown) may be mounted in side-by-side positions forms a circular ring where each of the lugs has laterally extending legs forming a W-shape aligned with a rotational axis of the wheel. The lugs may have an outfacing rib aligned with the rotational axis and a further outfacing rib orthogonal to the rotational axis. The lugs may be mutually offset around the circular ring in a sinusoidal pattern to further help with traction and wear and tear.

The ring 20 may have a pattern of through holes 28 in its surface as shown in FIG. 2. The spokes 70 may be secured to ring 20 using support pieces 76, 77 and common hardware (e.g., bolts). Furthermore, as shown in FIG. 9, the spokes 70 may be attached to both the hub 70 and ring 20 by a combination of bolts and support pieces 76, 77. For example, as shown, the spoke 70 may rest on a support piece 77 and have a bolt secure the spoke 71 to the hub 70 by penetrating the holes in all three components. Additionally, the support pieces 76, 77 may follow the curvature of both the hub 70 and the ring 20 to be flush against each surface, respectively, allowing for more secure connection. As described herein, the lugs 50A may have a flat portion with bolt holes 93 to allow the lugs 50A to easily secure to the ring 20. Additionally, the spokes 71 being removable allows for a decrease of fatigue on the wheel. Moreover, the modular aspect of the wheel 10 may reduce shipping costs, while also providing an ease of maintenance.

Furthermore, each spoke may attach to the peak 78 of the sine wave of the ring 20. It should be noted that when the spokes connect to the sinusoidal ring it attaches to the peak 78 as opposed to the valley 79 of the respective sinusoidal edge of the ring 20. It should be noted the alternating mounting of the spokes 71 contributes to the improved traction in soil while preserving a relatively light weight structure of the wheel. For example, the spoke 71 may be mounted with the top 71A on the first side 20A of the ring 20 and the bottom 71B attached to the second side 74 of the hub 70. Additionally, for example, the adjacent spoke 71 may be mounted with the top 71A on the second side 20B of the ring 20 and the bottom 71B attached to the first side 75 of the hub 70. This alternating pattern may continue for the entirety of the mounting of the spokes 71. Moreover, the spokes 71 may be mounted with their concave surface facing outward, as shown in FIG. 9. The alternating spoke orientation may allow for the weight to always be distributed and allowing the center of gravity to be perfectly balanced. It should be noted the spokes being built from a steel sheet provides the advantages of the light weight and lower cost of manufacturing the wheel 10. In another example, the wheel 10 may be made of 1020 steel.

Additionally, each spoke 71 attaching to the peak 78 of the sinusoidal edge of the ring 20 may allow the wheel 10 to stay balanced even during hard or sharp turns. For example, for hard turns the peak 78 may support the weight more so and thus the spokes 71 and hub 70 may compensate for the force. Moreover, because each spoke 71 crosses the center and attaches to the peak 78 the weight may be distributed evenly, which allows the wheel 10 to be more balanced. For example, while the wheel 10 is moving and the sine shape of the ring 20 shifts from left to right puts the stress on the spoke 71 because it attaches to peak 78.

Figure 10A:
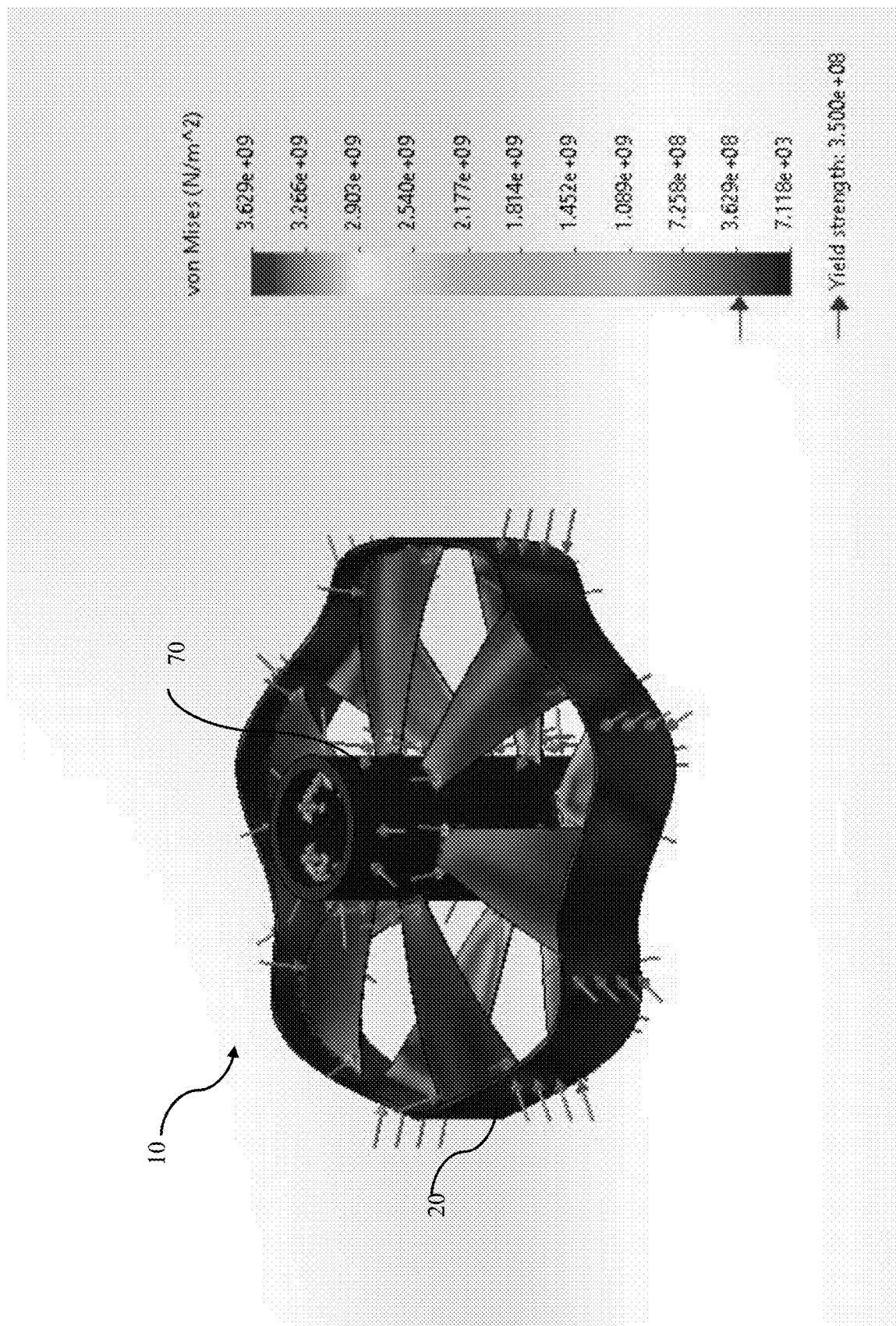
FIG. 10A illustrates a perspective view of the farm irrigation wheel during a von Mises stress simulation, according to an embodiment.
Figure 10B:
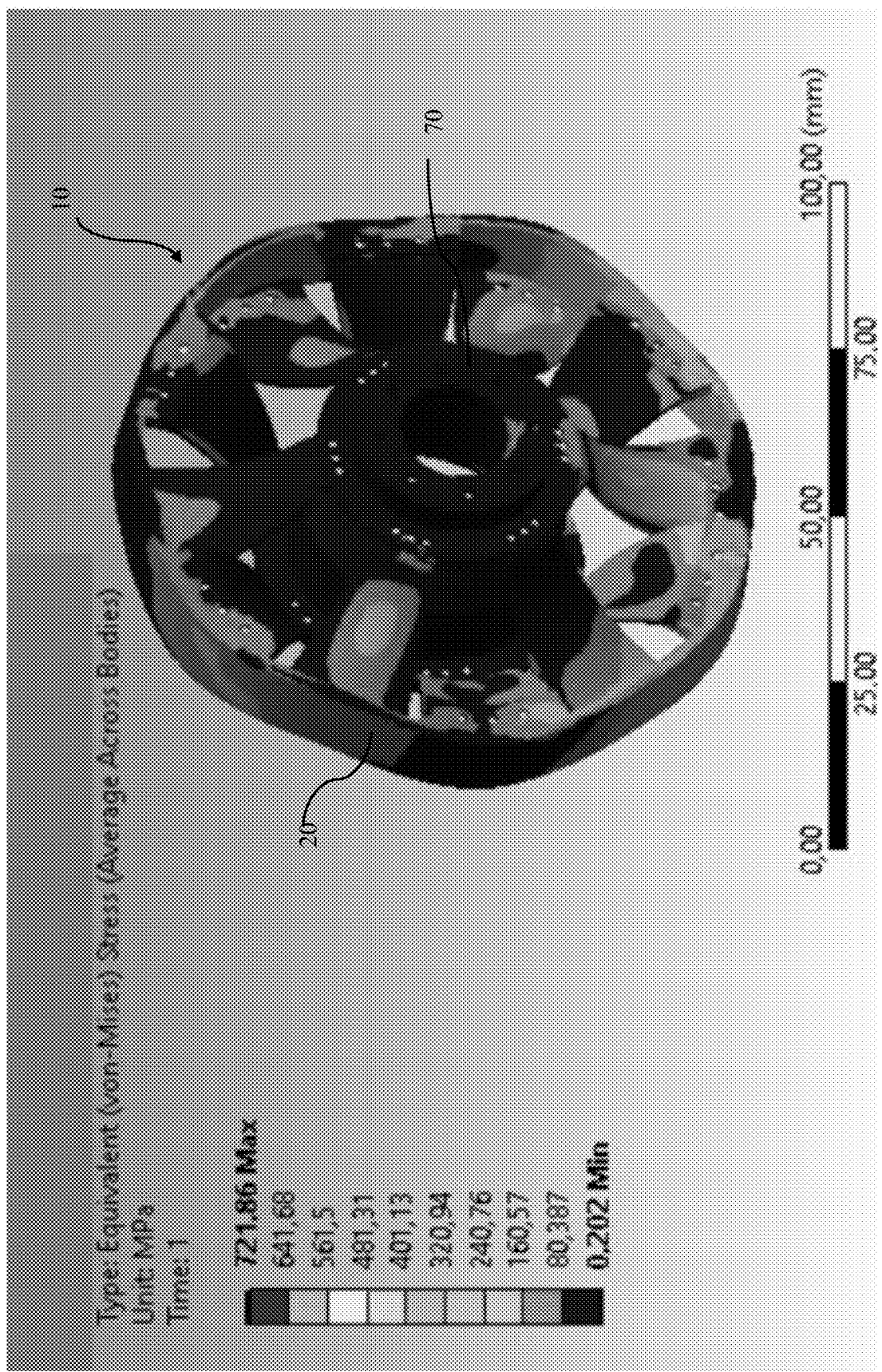
FIG. 10B illustrates a perspective view of the farm irrigation wheel during a von Mises stress simulation, according to an embodiment.

FIGS. 10A and 10B illustrates a perspective view of the farm irrigation wheel during a von Mises stress simulation, according to an embodiment. For example, in a simulation test, a 3D of the wheel 10 without the lugs 50A was evaluated for it is strength under varying conditions. During the von Mises Stress test simulation, the wheel 10 without the lugs 50A had a yield strength of 3.500e+08 N/m^2. Thus, the wheel 10 can withstand a typical load and not deform in any way. Additionally, this farm irrigation wheel 10 has a better yield strength because of the alternating spokes 71, while still being durable and providing traction. As testing showed, ach wheel may withstand over 20,000 lbs. of force before breaking with a max load is 6,000 lbs. per wheel (12,000 lbs. per tower). Furthermore, as shown in FIG. 10A, the darkest grey portion of the gradient is the outer most portion of the wheel 10. This shows the ring 20 and hub 70 experience the least amount of stress. While the lightest portion of the gradient is the hub 70 and spoke 71 connection, meaning that connection experienced the most stress. However, as described herein, the stress the connection had was still minimal even under a large load. As shown in FIG. 10B, the darkest grey portion of the gradient is the outer portion of the wheel 10, while under a larger load. This shows the ring 20 may experience some stress under heavy loads, but the hub 70 is relatively stressless.

Figure 10C:
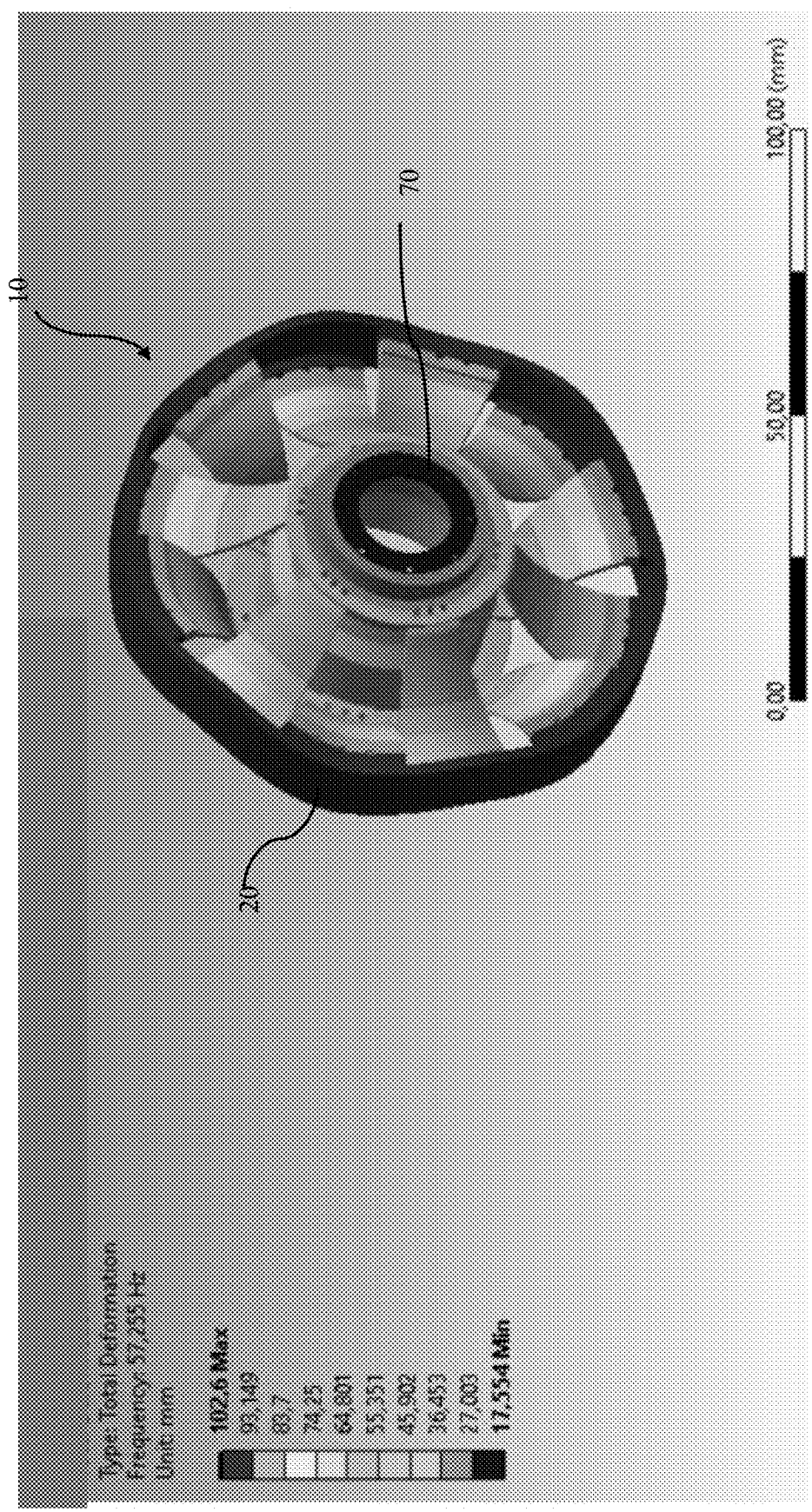
FIG. 10C illustrates a perspective view of the farm irrigation wheel during a vibration simulation, according to an embodiment.

FIG. 10C illustrates a perspective view of the farm irrigation wheel during a vibration simulation, according to an embodiment. It should also be noted that the wheel 10 may further ensure the hub 70 does not experience a large amount of vibration from the system. Through analysis testing, it showed the vibrations stayed near the outer portions of the wheel and did not permeate to the hub 70 of the wheel 10. As shown in FIG. 10C, the vibrations stay towards the outer portion of the wheel 10 and do not reach the hub 70. The wheel 10 was specifically designed to keep the vibration from reaching the hub 70 of the wheel 10. Typically, the hub 70 is where the drivetrain and gearbox sit, which is the first major part to fail on a pivot machine. Furthermore, on-pneumatic wheels typically accelerate the drivetrain's failure. The alternating positions of the spokes, along with their shape further help to ensure the vibrations do not resonate to the center hub 70. The same spoke shape without concavity was also tested in an ansys computer simulation, the results showed the spoke with no concavity had 10x less strength. Furthermore, the spokes 71 with a concave surface 71C may increase the strength approximately by ten times.

Furthermore, as shown in FIG. 10C the darkest grey portion of the gradient is the outer most portion of the wheel 10. Again, this means the most vibration is near the ring 20 of the wheel 10. While the black portion of the gradient is the hub 70, meaning the hub 70 experienced the minimum amount of vibration.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A wheel comprising:
    a circular ring having:
        a central axis, an outer surface having a first outer edge and a second outer edge, and a plurality of holes disposed on the outer surface;
    a plurality of spokes each having:
        a concaved surface, a bottom end, and a top end; each bottom end being adapted to attach to a hub, the hub being aligned with the central axis and having a first side and a second side, each top end being adapted to attach to the circular ring, and each of the plurality of spokes being concaved and arranged in an alternating pattern, wherein the top end of each of the plurality of spokes is attached alternately to the first outer edge or the second outer edge of the circular ring and the bottom end of each of the plurality of spokes is attached alternately to the first side or the second side of the hub;
        wherein a first width of the bottom end is smaller than a second width of the top end;
    a plurality of lugs having:
        a first leg and a second leg, each extending from a center rib and a lug plate adapted to connect the first leg to the center rib;
    wherein the plurality of lugs is disposed on the outer surface of the circular ring;
    wherein the center ribs of the plurality of lugs form a sinusoidal pattern.

2. The device of claim 1, wherein each of the plurality of lugs are made of steel.

3. The device of claim 2, wherein each of the plurality of lugs have an overmolded layer of rubber.

4. The device of claim 1, wherein the first side is larger than the second side of the hub.

5. The device of claim 1, wherein each of the plurality of lugs are secured to the circular ring by bolts.

6. The device of claim 1, wherein the plurality of spokes is secured to the circular ring using connection hardware.

7. The device of claim 1, wherein the plurality of holes disposed on the outer surface form a sinusoidal pattern.

8. A wheel comprising:
    a hub;
    a circular ring having:
        a central axis, an outer surface having a first outer edge and a second outer edge, and a plurality of holes disposed on the outer surface;
    a plurality of spokes, each being adapted to attach to both the hub and the circular ring, each of the plurality of spokes being concaved and arranged in an alternating pattern; and
    a plurality of lugs disposed on the outer surface of the circular ring, wherein each of plurality of lugs has a first leg and a second leg, each extending from a center rib and a lug plate adapted to connect the first leg to the center rib;
    wherein each of the plurality of spokes alternate orientation and have a concaved surface;
    wherein the center ribs of the plurality of lugs form a sinusoidal pattern.

9. The device of claim 8, wherein each of the plurality of spokes has a bottom end and a top end.

10. The device of claim 9, wherein a first width of the bottom end is smaller than a second width of the top end.

11. The device of claim 8, wherein each of the plurality of lugs are mutually laterally offset in a sinusoidal pattern.

12. The device of claim 8, wherein the plurality of holes disposed on the outer surface form a sinusoidal pattern.

13. The device of claim 8, wherein the plurality of spokes is secured to the circular ring using connection hardware.

14. The device of claim 8, wherein each of the plurality of lugs are made of spring steel.

15. The device of claim 14, wherein each of the plurality of lugs have an overmolded layer of rubber.

16. The device of claim 8, wherein an interior of the center rib is made of a rubber material.

17. A wheel comprising: a hub, a circular ring having an outer surface and plurality of holes disposed on the outer surface, and a plurality of spokes connecting the hub to the circular ring; each of the plurality of spokes being concaved and arranged in an alternating pattern; wherein each of the plurality of spokes is compliant and the plurality of holes disposed on the outer surface form a sinusoidal pattern.

18. The device of claim 17, further comprising a plurality of lugs disposed on the circular ring, wherein each of the plurality of lugs is compliant.

19. The device of claim 18, wherein each of the plurality of lugs is mutually offset around the circular ring in a sinusoidal pattern.

* * * * *